Patented June 12, 1951

2,556,876

UNITED STATES PATENT OFFICE 2,556,876

POLYMERIC AZINES, HYDRAZONITRILES, AND AZONITRILES

Julian W. Hill, Wilmington, Del., assignor to E. I. du Pont de Nemours & Company, Wilmington, Del., a corporation of Delaware No Drawing. Application October 24, 1947, Serial No. 782,008

22 Claims. (Cl. 260—144)

This invention relates to aliphatic azo compounds and more particularly to polymeric azo compounds.

Monomeric azonitriles are known. Thus Thiele and Heuser, Annalen 290, 1–43 (1896) describe the preparation of azodiisobutyronitrile. The method of preparation described by Thiele and Heuser is the reaction of a ketone such as acetone with hydrogen cyanide and hydrazine to give the hydrazonitrile followed by mild oxidation to the azonitrile. This method has been employed by Hartmann (Rec. trav. chim. 46, 150 [1927]; Chem. Weekblad 23, 77–8 [Jan. 1926] and Dox, J. Am. Chem. Soc. 47, 1471 [1925]). The Thiele and Heuser method when applied to higher molecular weight ketones such as acetophenone, diisopropyl ketone, camphor, pinacolone, and diisobutyl ketone gave substantially no hydrazonitrile or azonitrile. No polymeric azonitriles are, however, known.

This invention has as an object the preparation of polymeric azonitriles. A further object is the preparation of polymeric hydrazonitriles. Another object is the preparation of polymeric azines. A still further object is the provision of new polymerization catalysts and processes employing the same. Other objects will appear hereinafter.

These objects are accomplished by the following invention wherein an aliphatic diketone having a chain of at least four carbons between the oxo carbonyl groups is reacted with hydrazine to give the polymeric azine. Treatment of the polymeric azine with hydrogen cyanide gives the polymeric hydrazonitrile. Mild oxidation of this, e. g., with chlorine or bromine gives the polymeric azonitrile. The polymeric azines, the polymeric hydrazonitriles, the polymeric azonitriles, and the polymeric nitriles formed on heating the latter are portions of the invention as is also the use of the azonitriles as polymerization catalysts in the addition polymerization of polymerizable ethylenically unsaturated compounds.

The following examples, in which the parts given are by weight, further illustrate the process of this invention. The first example illustrates the preparation of the polymeric azine, hydrazonitrile and azonitrile while Examples II, III, and IV illustrate the use of polymeric azonitriles as catalysts for the addition polymerization of polymerizable compounds having at least one ethylenic double bond.

EXAMPLE I

A. Preparation of the polymeric azine

A mixture of 27 parts of 2,15-cetanedione, 5.3 parts of hydrazine hydrate and 60 parts of absolute ethanol was heated in a closed pressure-resistant vessel at a temperature of 150° C. for 6 hours. After cooling, the contents were poured into water and the solid polymeric azine which precipitated was collected on a filter, dried, and weighed. It amounted to 26 parts which corresponded to 100% of the theoretical. The analysis was: Calculated for $C_{16}H_{30}N_2$: C, 76.8; H, 12.0; N, 11.2; Found: C, 76.7; H, 12.0; N, 11.0. The above reaction is represented by the following equation:

$$CH_3CO(CH_2)_{12}COCH_3 + N_2H_4 \cdot H_2O \longrightarrow$$

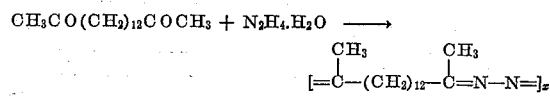

B. Preparation of the polymeric hydrazonitrile

The polyazine obtained as described in part A above was dissolved in 120 parts of ethanol at 40–50° C. and 27 parts of hydrogen cyanide was added through a condenser. After stirring for a few minutes, a plastic, rubber-like solid was formed which was separated from the solvent by decantation and dried in vacuo. The weight of the polymeric hydrazonitrile was 30 parts, which corresponded to a 98% yield. The equation for this reaction is as follows:

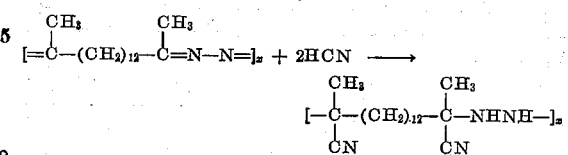

C. Preparation of the polymeric azonitrile

To a solution of the polymeric hydrazonitrile (30 parts), obtained as described in B above, in a mixture of 500 parts of methylene chloride and 9 parts water, was added dropwise a solution of 19.7 parts of N,N'-dichlorodimethylhydantoin in 142 parts of methylene chloride. The solution was stirred for two hours and filtered to remove the solid dimethylhydantoin which formed. The filtrate was washed with water and dried over anhydrous magnesium sulfate. The solvent was evaporated under reduced pressure leaving a residual, soft, tacky polymeric azonitrile in nearly quantitative yield. This product was characterized by its ultra-violet absorption spectrum. A maximum absorption peak was exhibited at 3450 Å which is characteristic of the C—N=N—C group. This reaction is represented by the following equation:

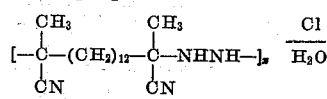

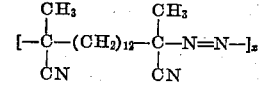

EXAMPLE II

A pressure reactor was charged with 20 parts of acrylonitrile, 80 parts of cyclohexane, and 0.1 part of the azonitrile prepared from 2,15-cetanedione as described in Example I. Air was flushed from the reactor with nitrogen and the reactor was closed and heated for 4 hours at 60° C. in a water bath. The acrylonitrile polymer obtained was collected on a filter and dried at room temperature. The yield was 4.5 parts, which amounted to a conversion of 23%. The relative viscosity of the acrylonitrile polymer was 1.363 determined at 25° C. in dimethylformamide at a concentration of 0.1 g./100 ml. of solution.

EXAMPLE III

A pressure reactor lined with stainless steel was charged with 90 parts of benzene and 0.1 part of a polymeric azonitrile prepared from 2,15-cetanedione as described in Example I. Air was flushed from the reactor with nitrogen and the reactor was evacuated, pressured to 500 atmospheres with ethylene, and heated to 100° C. for 9.5 hours while the pressure was maintained at 800–1000 atmospheres by occasional repressuring with ethylene. The reactor was cooled, bled of excess ethylene, and opened. The yield of polyethylene was 6 parts. A film pressed from the polymer between smooth surfaces at 190° C. had a tensile strength of 4780 lbs./sq. in with an elongation at break of 770%. The relative viscosity of the polymer was 1.195 determined at 85° C. in xylene at a concentration of 0.125 g./100 ml. of solution.

EXAMPLE IV

A pressure reactor lined with stainless steel was charged with 100 parts of vinyl acetate, 80 parts of tertiary butyl alcohol, and 0.1 part of the polymeric azonitrile prepared from 2,15-cetanedione as described in Example I. Air was flushed from the reactor with nitrogen and the reactor was cooled, evacuated, closed, and heated to 110° C. for 9.5 hours. Unreacted vinyl acetate and tertiary butyl alcohol were removed from the resulting polyvinyl acetate by distillation with steam and the polymer was dried by milling at 140–150° C. on a rubber mill. The yield of polyvinyl acetate was 44 parts. Its relative viscosity was 1.189 determined at 25° C. in chloroform at a concentration of 0.1 g./100 ml. of solution. The polyvinyl alcohol obtained by alkaline methanolysis of the polyvinyl acetate had a relative viscosity of 1.224 determined at 25° C. in 85% phenol at a concentration of 0.1 g./100 ml. of solution.

In the process of this invention which leads to the production of the azine there may be employed any dialdehyde or diketone that has a chain of from four to sixteen carbons separating the carbonyl groups. The invention has been illustrated in this aspect with the use of 2,15-cetanedione but is generic to the employment of any diketone that has a chain of from four to sixteen carbons separating the carbonyl groups including not only the diketone of the example but also 2,7-octanedione, 2,8-nonanedione, 2,10-tridecanedione, and 2,11-pentadecanedione. Particularly preferred are diketones of 9–16 carbons which have the carbonyl groups separated by aliphatic hydrocarbon chains of 5–12 carbons. Especially preferred because of their availability and the avoidance of reaction complications are the diketones of 9–16 carbons wherein the molecule is hydrocarbon except for the two carbonyl groups and particularly the alkanediones of such carbon content having a chain of 5 to 12 carbons between the carbonyl groups. Compounds having carbonyl groups closer than 4 carbons are not desired in view of the ability of such compounds to give rise to ring formation with the result that cyclic rather than polymeric nitrogen-containing compounds are formed.

The dicarbonyl compound is reacted with hydrazine preferably in the form of hydrazine hydrate. The hydrazine is employed in a ratio of from 0.9 to 1.1 and preferably one mole per mole of dioxo compound. Inert solvents or diluents such as ethanol may be present during the reaction. The temperature of reaction should be between 75–175° C.

The reaction of the polymeric azine with hydrogen cyanide is usually carried out within the temperature range of 0–100° C. with a time of from 1–24 hours. Time and temperature of this reaction are interdependent variables. It is preferred that the hydrogen cyanide contain less than 10% water although the reaction will take place when as much as 50% water is present based on the weight of hydrogen cyanide. To maintain a homogeneous reaction system sufficient ethanol or other solvent should be present at higher water concentrations.

The hydrazonitrile can be readily oxidized to the azonitrile by such oxidizing agents as chlorine, bromine or compounds containing halogen on nitrogen such as the N-chloro-hydantoins.

The polymeric azonitriles have a chain of a plurality of recurring units of the formula.

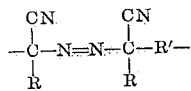

wherein R is alkyl of one to four carbons and R' is a bivalent saturated aliphatic hydrocarbon radical having a chain of at least 4, preferably 5 to 12 carbons, between its free valences.

The polymeric azonitriles are useful as polymerization catalysts in the addition polymerization and copolymerization of polymerizable ethylenically unsaturated compounds. Ethylene polymerized with the azonitrile as described in Example II has unusual toughness. The polymeric azonitriles of this invention are generally applicable in addition polymerization and copolymerization. Illustrative materials which can be polymerized either singly or in combination are vinyl chloride; vinyl fluoride; vinylidene fluoride; vinylidene chloride; polymerizable compounds of the general formula: $F_2C=CXY$ where X is H, Cl, or F, and Y is Cl or F; acrylonitrile; methyl vinyl ketone; vinyl esters, e. g., vinyl acetate; acrylic and methacrylic compounds, e. g., methyl methacrylate and methacrylamide; and other polymerizable compounds containing but one carbon to carbon unsaturation and that ethylenic; polymerizable compounds containing two or more isolated or conjugated ethylenic double bonds, e. g., the diacrylic acid esters of glycols and polyethylene glycol, e. g., tetraethylene glycol dimethacrylate, diallyl diglycolate, diallyl carbonate, butadiene, chloroprene, etc. Esters or anhydrides of maleic or fumaric acids may be used in the preparation of copolymers, for example, with styrene. The majority of the above compounds contain the $CH_2=C<$ group and polymerizable compounds containing this terminal methylene group represent a favored class of polymerizands.

The amount of polymeric azonitrile that may be employed may vary between 0.005 and 5% based on the weight of polymerizable compounds present. The temperature employed in the polymerization is usually 50–150° C. although higher or lower temperatures may be used. The polymerization may be carried out in any convenient manner such as emulsion, solution, granulation, or bulk polymerization systems.

Nitrogen can be removed from the polymeric azonitriles by heating them at temperatures usually above 80° C. The resulting compounds are polymeric nitriles. These may be used as intermediates for the formation of polyamines.

The foregoing detailed description has been given for clearness of understanding only and no unnecessary limitations are to be understood therefrom. The invention is not limited to the exact details shown and described for obvious modifications will occur to those skilled in the art.

What is claimed is:

1. The process which comprises reacting by bringing into contact, hydrazine hydrate with an alkanedione containing between four and sixteen carbon atoms in the chain linking the keto groups to form the polymeric azine of said alkanedione.

2. In the process of preparing a polymeric azonitrile, the step which comprises reacting by bringing into contact, hydrazine hydrate with an alkanedione of nine to sixteen carbons having a chain of five to twelve carbons between the carbonyl groups.

3. The process which comprises reacting by bringing into contact, hydrazine hydrate with an alkanedione of nine to sixteen carbons having a chain of five to twelve carbons between the carbonyl groups.

4. In the preparation of a polymeric azine, the step which comprises reacting by bringing into contact, 2,15-cetanedione with one mole, per mole of the dione, of hydrazine hydrate.

5. The process which comprises reacting by bringing into contact, the polymeric azine of an alkanedione containing between four and sixteen carbon atoms in the chain linking the keto groups with hydrogen cyanide containing not more than 50% water at 0–100° C.

6. In the preparation of a polymeric azonitrile, the step which comprises reacting by bringing into contact, the polymeric azine of 2,15-cetanedione with hydrogen cyanide containing not more than 50% water at 0–100° C.

7. The process wherein an alkanedione containing between four and sixteen carbon atoms in the chain linking the keto groups, is reacted by bringing the same in contact with one mole, per mole of alkanedione, of hydrazine hydrate; the resultant polymeric azine isolated and reacted by bringing the same in contact with hydrogen cyanide containing not more than 50% and preferably not more than 10%, water; and the resultant polymeric hydrazonitrile reacted by bringing the same in contact with a halogen of the class consisting of chlorine and bromine.

8. Process of claim 7 wherein the diketone is 2,15-cetanedione.

9. The process wherein an alkanedione having a chain of five to twelve carbon atoms in the chain linking the keto groups is reacted by bringing the same in contact with one mole, per mole of alkanedione, of hydrazine hydrate; the resultant polymeric azine isolated and reacted by bringing the same in contact with hydrogen cyanide containing not more than 50% and preferably not more than 10%, water; and the resultant polymeric hydrazonitrile reacted by bringing the same in contact with a halogen of the class consisting of chlorine and bromine.

10. Polymeric 2,15-cetanedione azine.

11. The polymeric azine of an alkanedione containing between four and sixteen carbon atoms in the chain linking the keto groups.

12. The polymeric hydrogen cyanide addition product of the azine of an alkanedione containing between four and sixteen carbon atoms in the chain linking the keto groups.

13. The process which comprises oxidizing the polymeric hydrazonitrile of an alkanedione containing between four and sixteen carbons in the chain linking the keto groups by bringing said alkanedione in contact with a halogen of the class consisting of chlorine and bromine.

14. In the process of preparing a polymeric azonitrile, the step which comprises treating, with hydrazine hydrate, an alkanedione of nine to sixteen carbons having a chain of five to twelve carbons between the carbonyl groups.

15. In the process of preparing a polymeric azonitrile, the step which comprises bringing hydrazine hydrate into contact at 75–175° C. with an alkanedione of nine to sixteen carbons having a chain of five to twelve carbons between the carbonyl groups, the hydrazine hydrate being employed in the amount of from 0.9 to 1.1 mols per mol of alkanedione.

16. The polymeric hydrazonitrile of 2,15-cetanedione azine wherein the recurring units are of the formula

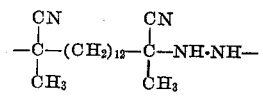

17. The polymeric hydrazonitrile of the azine of an alkanedione containing between two and fourteen carbon atoms in the chain linking the keto groups in which polymer the recurring units are of the formula

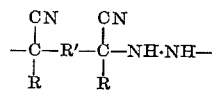

wherein R is alkyl and R' is a bivalent saturated aliphatic hydrocarbon radical having a chain of two to fourteen carbons between the free valences.

18. The polymeric azonitrile of the azine of an alkanedione containing between four and sixteen carbon atoms in the chain linking the keto groups in which polymer the recurring units are of the formula

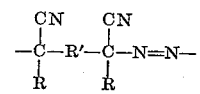

wherein R is alkyl and R' is a bivalent saturated aliphatic hydrocarbon radical having a chain of four to sixteen carbons between the free valences.

19. The polymeric azonitrile of the azine of an alkanedione containing between two and fourteen carbon atoms in the chain linking the keto groups in which polymer the recurring units are of the formula

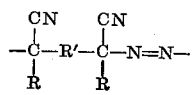

wherein R is alkyl and R' is a bivalent saturated aliphatic hydrocarbon radical having a chain of two to fourteen carbons between the free valences.

20. The polymeric azonitrile of 2,15-cetanedione azine wherein the recurring units are of the formula

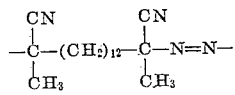

21. A polymer, the recurring units of which have the formula

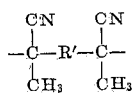

wherein R' is a bivalent saturated aliphatic hydrocarbon radical having a chain of four to sixteen carbons between the free valences.

22. A polymer, the recurring units of which have the formula

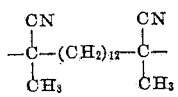

JULIAN W. HILL.

REFERENCES CITED

The following references are of record in the file of this patent:

UNITED STATES PATENTS

| Number | Name | Date |
|---|---|---|
| 1,087,428 | Blank et al. | Feb. 17, 1914 |
| 2,394,243 | Joyce | Feb. 5, 1946 |
| 2,469,358 | Alderson et al. | May 10, 1949 |
| 2,492,763 | Pinkney | Dec. 27, 1949 |

OTHER REFERENCES

Blaise, Compt. Rend., vol. 170, 1324–6 (1920).

De Bell et al., German Plastics Practice (1946), pp. 456, 457.